US012518901B2

(12) United States Patent
Gustavsson et al.

(10) Patent No.: US 12,518,901 B2
(45) Date of Patent: Jan. 6, 2026

(54) METHOD AND CIRCUITRY FOR CONTROLLING DISCHARGE OF A SOLENOID VALVE

(71) Applicant: Scania CV AB, Södertälje (SE)

(72) Inventors: Jens Gustavsson, Åkers Styckebruk (SE); Kurre Källkvist, Strängnäs (SE); Joakim Svantesson, Vendelsö (SE); Erik Jansson, Södertälje (SE)

(73) Assignee: Scania CV AB, Södertälje (SE)

( * ) Notice: Subject to any disclaimer, the term of this patent is extended or adjusted under 35 U.S.C. 154(b) by 65 days.

(21) Appl. No.: 18/559,837

(22) PCT Filed: May 16, 2022

(86) PCT No.: PCT/SE2022/050471
§ 371 (c)(1),
(2) Date: Nov. 9, 2023

(87) PCT Pub. No.: WO2022/245269
PCT Pub. Date: Nov. 24, 2022

(65) Prior Publication Data

US 2024/0242867 A1 Jul. 18, 2024

(30) Foreign Application Priority Data

May 20, 2021 (SE) .................................. 2150641-5

(51) Int. Cl.
*F02D 41/20* (2006.01)
*F02M 51/06* (2006.01)
(Continued)

(52) U.S. Cl.
CPC ............ *H01F 7/064* (2013.01); *F02D 41/20* (2013.01); *F02M 51/061* (2013.01);
(Continued)

(58) Field of Classification Search
None
See application file for complete search history.

(56) References Cited

U.S. PATENT DOCUMENTS 4,631,628 A 12/1986 Kissel
7,881,035 B2 2/2011 Takahashi et al.
(Continued)

FOREIGN PATENT DOCUMENTS

DE 19714607 A1 10/1998
EP 427127 A1 5/1991
(Continued)

OTHER PUBLICATIONS

Scania CV AB, International Patent Application No. PCT/SE2022/050471, International Preliminary Report on Patentability, Nov. 21, 2023.

(Continued)

*Primary Examiner* — Matthew W Jellett
(74) *Attorney, Agent, or Firm* — Moore & Van Allen PLLC; W. Kevin Ransom

(57) ABSTRACT

The disclosure proposes a method for controlling discharge of a solenoid valve arranged in a vehicle, wherein the solenoid valve comprises an inductor and a plunger arranged to be moved by the inductor from a hold position to a rest position, whereby the solenoid valve is opened or closed. The method comprises stepwise discharging the inductor by discharging the inductor at a slow decay rate during an operating time period during which a final part of a movement of the plunger from the hold position to the rest position takes place. The method further comprises discharging the inductor at a fast decay rate during at least one other time period, wherein the plunger is stagnant during at least a part of said other time period, wherein the fast decay rate is faster than the slow decay rate.

17 Claims, 5 Drawing Sheets

(51) Int. Cl.

| | |
|---|---|
| ***F16K 31/06*** | (2006.01) |
| ***H01F 7/06*** | (2006.01) |
| ***H01F 7/08*** | (2006.01) |
| ***H01F 7/16*** | (2006.01) |

(52) U.S. Cl.

CPC ......... *F16K 31/0675* (2013.01); *H01F 7/081* (2013.01); *H01F 7/1607* (2013.01); *F02D 2041/2051* (2013.01); *F02D 2041/2058* (2013.01)

(56) References Cited

U.S. PATENT DOCUMENTS

| | | | | |
|---|---|---|---|---|
| 9,618,557 | B2 | 4/2017 | Sykes | |
| 10,041,461 | B2 * | 8/2018 | Rezaei | F02M 63/0054 |
| 10,497,502 | B2 * | 12/2019 | Pecori | F16K 31/0675 |
| 10,996,274 | B2 * | 5/2021 | De Giacomo | H01F 7/064 |
| 2005/0146408 | A1 * | 7/2005 | Traversa | F02D 41/2464 335/220 |
| 2007/0188967 | A1 | 8/2007 | Smith et al. | |
| 2015/0204930 | A1 | 7/2015 | Sykes | |
| 2020/0023706 | A1 | 1/2020 | Kojima et al. | |

FOREIGN PATENT DOCUMENTS

| | | | |
|---|---|---|---|
| EP | 3330522 | A1 | 6/2018 |
| JP | 3632385 | B2 | 3/2005 |
| KR | 1020190037563 | A | 4/2019 |
| WO | 2006083977 | A1 | 8/2006 |
| WO | 2017114868 | A1 | 7/2017 |
| WO | 2019177522 | A1 | 9/2019 |
| WO | 2019201789 | A1 | 10/2019 |

OTHER PUBLICATIONS

Scania CV AB, International Patent Application No. PCT/SE2022/050471, International Search Report, Jun. 2, 2022.

Scania CV AB, International Patent Application No. PCT/SE2022/050471, Written Opinion, Jun. 2, 2022.

Scania CV AB, Swedish Patent Application No. 2150641-5, Office Action, Jan. 13, 2022.

Scania CV AB, European Patent Application No. 22805074.6, Extended European Search Report, Feb. 26, 2025.

* cited by examiner

METHOD AND CIRCUITRY FOR CONTROLLING DISCHARGE OF A SOLENOID VALVE

CROSS-REFERENCE TO RELATED APPLICATIONS

This application is a National Stage Patent Application (filed under 35 § U.S.C. 371) of PCT/SE2022/050471, filed May 16, 2022, of the same title, which, in turn claims priority to Swedish Patent Application No. 2150641-5 filed May 20, 2021, of the same title; the contents of each of which are hereby incorporated by reference.

TECHNICAL FIELD

The present disclosure relates to vehicles and to a method for controlling discharge of a solenoid valve of a vehicle. In particular the disclosure relates to controlling discharge of an inductor operated injector for use as an injector in a vehicle. The disclosure also relates to a discharge circuit, a computer program, and a computer-readable medium for implementing the method.

BACKGROUND

An injector is a mechanical device which is used to inject fluid into for example a combustion engine of a vehicle. For example, a fuel injector is used to inject fuel for the preparation of correct air-fuel mixture, which in turn provides efficient combustion in the combustion engine. Injectors may also be used for injecting other fluids, such as fluids used to reduce the nitrous oxide emissions of combustion engines, e.g. urea.

In an electronically controlled injector, control of fluid speed, quantity, pressure and timing is performed electronically by means of for example a solenoid. The solenoid controls a plunger, or other hardware component, that moves when an inductor is charged or discharged, whereby a flow path is opened or closed. Hence, this type of injector is in fact a solenoid valve.

When the supply voltage to the injector is removed (for example when attempting to close an inductor actuated fluid injection device), the energy stored in the inductor must be discharged, which is commonly done by dissipating the energy as heat by recirculating the current in a low voltage circuit. Dissipating the energy in a low voltage circuit can be considered a slow discharge method since the power dissipation of the circuit is described by the relation $U^2/R$ where U is the voltage driving the dissipation and R is the circuit resistance.

However, sometimes rapid discharge of the inductor is desirable to ensure rapid closure of the injector. This may be achieved by dissipating the energy as heat in a dedicated component, herein referred to as a fast decay circuit. Dissipating the energy in a fast decay circuit, for example by the use of a Transient Voltage Suppression, TVS, diode, will lead to a much higher power dissipation and thereby shorter discharge time. For example, EP 0 427 127 A1 discloses using a Zener diode to ensure a rapid closure of an injector. However, rapid discharge is also associated with certain problems as the discharge is typically so fast that it is difficult to control or monitor.

Hence, the different discharge strategies described above have both advantages and disadvantages. Therefore, there is a need for improved discharge strategies for use when operating injectors and other solenoid valves.

SUMMARY

It is an object of the disclosure to alleviate at least some of the drawbacks with the prior art. Thus, it is an object to provide improved ways of controlling discharge of a solenoid valve that can maintain advantages from both methods while negating most of the disadvantages. Furthermore, it is an object of some embodiments to provide a discharge strategy for a solenoid valve, which enables a short closing (or opening) time while at the same time facilitating monitoring of the discharge procedure.

According to a first aspect, this disclosure proposes a method for controlling discharge of a solenoid valve arranged in a vehicle, wherein the solenoid valve comprises an inductor and a plunger arranged to be moved by the inductor from a hold position to a rest position, whereby the solenoid valve is opened or closed. The method comprises stepwise discharging the inductor by discharging the inductor at a slow decay rate during an operating time period during which a final part of a movement of the plunger from the hold position to the rest position takes place. The method further comprises discharging the inductor at a fast decay rate during at least one other time period (different from said operating time period), wherein the plunger is stagnant during at least a part of said other time period, wherein the fast decay rate is faster than the slow decay rate. By combining application of fast and slow decay rates in the same discharge cycle, most of the advantages from both strategies can be achieved while negating most of the disadvantages. Combining the discharge strategies using different decay rates allows for an improved discharge procedure, which is not possible to achieve with either of the discharge strategies alone.

In some embodiments the plunger is stagnant during a major part of the at least one other time period. By mainly applying the fast decay rate when the plunger is stagnant, wear on the plunger and its end is minimized.

In some embodiments the discharging of the inductor at the fast decay rate is performed prior to the discharging of the inductor at the slow decay rate. Thereby, opening (or closing) time may be decreased whilst still enabling hardware diagnostics, such as plunger stuck tests while applying the slow decay rate.

In some embodiments switching from discharging the inductor at the fast decay rate to the discharging the inductor at the slow decay rate is performed at the latest a predefined time before the plunger reaches the rest position. Thereby, detection of electric magnetic force caused by the final part of the movement of the plunger is facilitated as slow decay rate is applied a predefined time before the plunger reaches the rest position.

In some embodiments switching from discharging the inductor at the fast decay rate to the discharging the inductor at the slow decay rate is performed at the latest when the plunger starts to move from the hold position. Thereby, detection of electric magnetic force caused by the movement of the plunger is facilitated during the entire plunger movement.

In some embodiments the discharging the inductor at the fast decay rate is performed subsequent to the discharging the inductor at the slow decay rate. In some embodiments switching from discharging the inductor at the slow decay rate to the discharging the inductor at the fast decay rate is performed upon the plunger reaching the rest position such that re-bounce of the plunger from the rest position is prevented. Thereby, the risk of the plunger bouncing against its end position is minimized as the electromagnetic force on the plunger is increased when it reaches the rest position.

In some embodiments, the method comprises monitoring a discharge current during discharging of the inductor at the slow decay rate and controlling operation of the solenoid valve based on the monitored discharge current. Thereby, effective control and diagnosing of the discharge procedure is achieved.

In some embodiments, the monitoring comprises detecting a back-electromotive force caused by the movement of the plunger. Thereby, it is possible to detect if the plunger does not move during a discharge cycle, i.e. that it is stuck.

In some embodiments, durations of the operating time period and/or the at least one other time period are predefined. Tabulated values are typically used, at least during an initial time interval and are typically sufficient to achieve efficient discharge and controlled plunger movement.

In some embodiments, durations of the operating time period and/or the at least one other time period are dynamically configurable. More specifically, the time periods may be adjusted to compensate for wear, temperature changes etc. These embodiments may be used to minimize variations in response time by accurately controlling the time required to discharge the inductor under different operating conditions and with varying hardware performance. Effects achieved by these embodiments may include increased predictability in the response time of any connected mechanical system (such as a plunger of a solenoid valve), decreased sensitivity to operating conditions (such as temperature) and decreased sensitivity to mechanical wear of hardware components.

In some embodiments, durations of the operating time period and the at least one other time period are configured to achieve a certain total discharge time, and the total discharge time comprises a time from starting the discharging until the plunger has reached the rest position. Effects achieved by these embodiments may include increased predictability in the response time (i.e. opening or closing time) of the solenoid valve.

In some embodiments, the discharging is dominated by voltage drop caused by a fast decay circuit, when discharging the inductor at the fast decay rate. By using a voltage drop caused by a fast decay circuit fast power dissipation is achieved. In some embodiments, the fast decay circuit comprises a Zener diode, transient-voltage-suppression diode and/or one or more transistors.

In some embodiments, discharging of the inductor at the slow decay rate during an operating time period comprises dissipating energy as heat by recirculating a discharge current in a plurality of components in a recirculation current path during at least parts of the operating time period.

In some embodiments, the slow decay rate is an average decay rate over the operating time period and the fast decay rate is an average decay rate over the at least one other time period. Hence, the fast and slow decay rates may be accomplished by combining different discharge strategies, for example use of different recirculation paths.

In some embodiments, discharging the inductor at a slow decay rate during the operating time period is achieved by toggling between the fast decay rate and another decay rate lower than the fast decay rate. These embodiments will allow for faster plunger motion than would be the case when applying only the slow rate.

According to a second aspect, the disclosure relates to a discharge circuit configured to control a solenoid valve comprising an inductor and a plunger arranged to be moved by the inductor from a hold position to a rest position, whereby a nozzle of the solenoid valve is opened or closed. The discharge circuit comprises a fast decay current path configured to discharge the inductor at a fast decay rate and a slow decay current path configured to discharge the inductor at a slow decay rate, wherein fast decay rate is faster than the slow decay rate. The discharge circuit also comprises control circuitry configured to selectively connect the inductor to the fast and slow decay current paths. The discharge circuit is configured to, by means of the fast and slow decay current paths and the control circuitry, perform the method according to the first aspect.

According to a third aspect, the disclosure relates to a vehicle comprising the discharge circuit.

DETAILED DESCRIPTION

A control strategy for a solenoid valve is herein proposed, in which discharge of an inductor is performed stepwise at different discharge rates, herein referred to as decay rates. The technique may be implemented by arranging the inductor in a manner that allows current to flow through the inductor, while allowing for several different recirculation paths during the discharge procedure. For example, the fast and slow rates are achieved by switching between a slow decay current path and a fast decay current path during the discharge procedure.

For better understanding of the proposed technique, advantages, and disadvantages with slow and fast discharge of an inductor will first be briefly discussed.

Slow inductor discharge may reduce wear on hardware components due to slower movement of hardware controlled by the inductor. Furthermore, slow discharge may reduce electromagnetic radiation and also reduce the performance demands on equipment monitoring the process. For example, lower sample rate is required to monitor a discharge current during the discharge procedure. Fast discharge on the other hand can help increase the precision as the closing time can be more accurately controlled. It may also improve the performance of the connected hardware since reduced discharge times can enable faster control (for example more injections per unit of time). The proposed technique makes it possible to combine advantages of both strategies as will now be explained.

When current flows through an inductor an electromagnetic force is generated. This force acts on a plunger. When the current is discharging then the electromagnetic force (which is proportional to the current) is reduced. When the current is low enough the plunger starts moving back to its rest position. Hence, the actual movement of the plunger does not start right away when a discharge procedure is started, but first after a certain amount of time. In addition, the plunger may stop moving before the inductor is completely discharged because it has reached an end point where it is physically blocked to move further. The disclosure is based on the insight that requirements on the discharge procedure differ between different points in time during the discharge cycle. For example, the problems related to wear and monitoring discharge current are mainly relevant when the actual plunger movement takes place. A method is therefore proposed where a slower decay rate is used at times when the plunger movement at least partly takes place. In some embodiments, the discharge is initiated using a fast decay discharge rate for a period of time, allowing the energy in the coil to dissipate partially and then switched to a slow decay rate when the plunger starts to move. The result is a fast discharge of the solenoid valve while still avoiding wear and allowing the current indicating the movement of the plunger to be measured.

Figure 1:
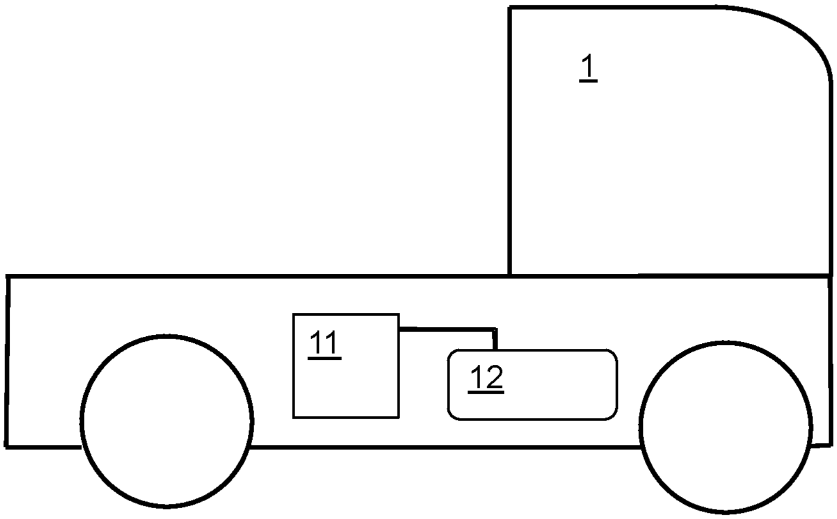
FIG. 1 illustrates a vehicle where the proposed technique may be implemented.

FIG. 1 illustrates a vehicle 1, here a truck, where the proposed technique may be implemented. The vehicle 1 may comprise a means for transportation in broad sense and is for example a bus, a truck, or other similar manned or unmanned vehicle. The illustrated vehicle 1 comprises a combustion engine 11 and a fluid storage 12 arranged to supply a fluid, such as fuel or fluids used to reduce the nitrous oxide emissions, into the combustion engine 11 or its aftertreatment system. In a real implementation there might of course be several fluid storages. For simplicity only one is illustrated.

Figure 2:
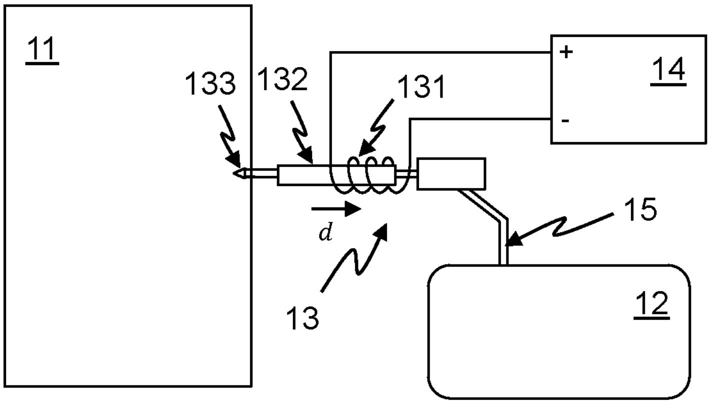
FIG. 2 illustrates an injector arranged to control supply of a fluid to a combustion engine.

FIG. 2 conceptually illustrates a solenoid valve 13, here an injector, arranged to control supply of a fluid from a fluid storage 12 to a combustion engine 11. The proposed technique will herein be described with reference to the injector, but it must be appreciated that the technique may be implemented in other applications associated with similar problems.

The solenoid valve 13 is for example a fuel injector or an injector for fluids used to reduce the nitrous oxide emissions. An example of a well-known type of an injector comprises a solenoid-controlled injection nozzle for fuel injection into a combustion chamber of a diesel engine. This type of injector can also be used for injecting other types of fluids. The solenoid valve 13 comprises an inductor 131 (also referred to as coil, spiral or helix) and a plunger 132. The plunger 132 is a moving part (i.e. hardware of any shape) of the solenoid valve 132 that transfers linear motion to another component that it is designed to operate. In the illustrated example, the plunger acts on a nozzle 133. The inductor 131, is an electromagnet, configured to generate a controlled magnetic field. The inductor 131 can be arranged to produce a uniform magnetic field in a volume of space when an electric current is passed through it. The magnetic field generates an electromagnetic force that acts on the plunger 132 in a direction d. Typically a counter force, generated for example by a spring (not shown), acts on the plunger 132 when the inductor 131 is discharged. Thereby, the plunger 132 moves when the inductor 131 is charged or discharged, whereby a flow path 15 between the fluid storage 12 and the combustion engine 11 is opened or closed, depending on the construction of the solenoid valve 13.

The solenoid valve 13 is connected to a discharge circuit 14 configured to control a discharge procedure for moving the plunger 132 from a hold position, which is typically an end position where an electromotive force generated by the inductor holds the plunger in place, to a rest position, which is typically an opposite end position where the plunger is held by another force such as a spring force.

Figure 3:
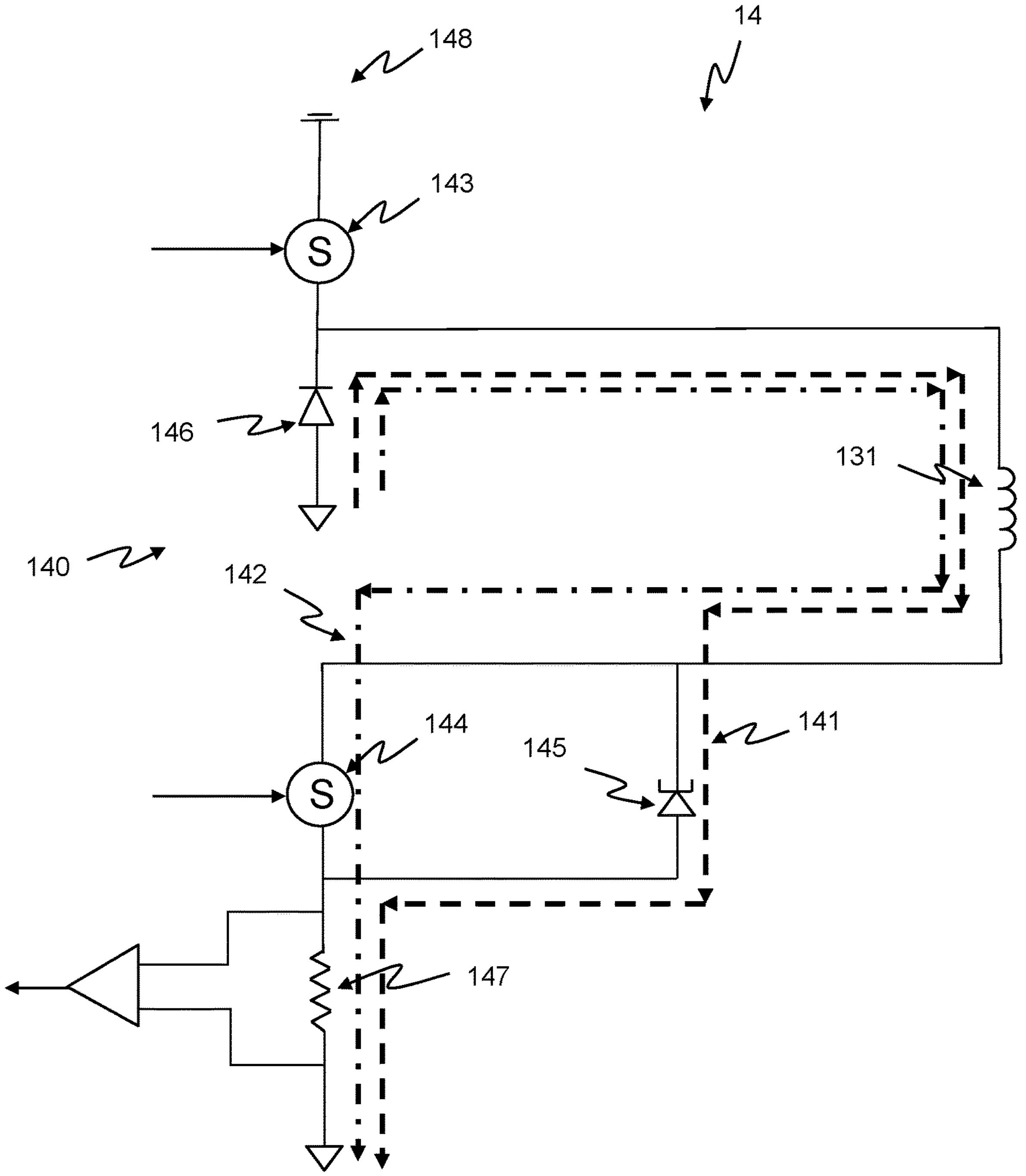
FIG. 3 illustrates a discharge circuit configured to control a solenoid valve comprising an inductor according to one example embodiment.

FIG. 3 illustrates discharge circuit 14 configured to control a solenoid valve 13 (FIG. 2) comprising an inductor 131 and a plunger 132 that moves when the inductor 131 is discharged or charged. The discharge circuit 14 comprises a fast decay circuit 145, a high side diode 146, a current sense resistor 147 and control circuitry 140. In the illustrated embodiment the control circuitry 140 comprises a high side switch 143, a low side switch 144, for example transistors, and a control arrangement 10 (not shown in FIG. 3, see FIG. 5), such as a micro controller, configured to control the high side switch 143 and the low side switch 144.

The inductor 131 is connected between a power source 148 and ground. The upper circuit with respect to the inductor 131 is referred to as high-side circuit and the lower circuit is referred to as low side circuit. The high side switch 143 is arranged between the power source 148 and the inductor 131 to selectively connect the power source 148 to a high side of the inductor 131, whereby the inductor 131 is charged. The high side diode 146 is arranged in parallel with the power source 148 to enable current recirculation when the power source 148 is disconnected, whereby the inductor 131 can be discharged.

The current sense resistor 147 is arranged in the low side circuit. The current sense resistor 147 enables a current measurement device (not shown) to measure a charge or discharge current flowing through the inductor 131.

The fast decay circuit 145, which may be one fast decay component, here embodied as a high voltage TVS-diode (Transient Voltage Suppression diode), is a component that provides high energy dissipation. The fast decay circuit 145 is arranged between the low side of the inductor 131 and the current sense resistor 147. More specifically, the cathode of the TVS-diode is connected to the high side of the inductor 131 and the anode of the TVS diode is connected to the current sense resistor 147.

The low side switch 144 is also arranged between the low side of the inductor 131 and the current sense resistor 147. The low side switch 144 is arranged in parallel with the fast decay circuit 145. When the low side switch 144 is closed voltage over the fast decay circuit 145 is prevented from reaching the breakthrough voltage, whereby no current can flow through the fast decay circuit 145. The low side switch 144 is arranged to enable selective activation of different recirculation paths for use when discharging the inductor 131 as will now be described in further detail.

The discharge circuit 14 comprises two recirculation paths to be used when discharging the inductor 131. More specifically discharge circuit 14 comprise a fast decay current path 141 (illustrated by dashed line) and a slow decay current path 142 (illustrated by dash dotted line). The slow decay current path 142 is also referred to as a current recirculation path.

When the slow decay current path 142 is active, current is recirculated through the high side diode 146, the inductor 131, the low side switch and the current sense resistor 147. The stored energy in the inductor 131 is dissipated as heat in all components in the low current path, dominated by the resistance of the inductor 131 itself. Dissipating energy stored in the inductor 131 in a low voltage, or recirculation, circuit can be considered a slow discharge method since the power dissipation of the circuit is described by the relation $$\frac{U^2}{R}$$

where U is the voltage driving the dissipation and R is the circuit resistance. A small voltage driving the dissipation will thus dissipate the energy slowly.

When the fast decay current path is active, energy stored in the inductor 131 is recirculated through the high side diode 146, the inductor 131, the fast decay circuit 145 and the current sense resistor 147. The stored energy in the inductor 131 is dissipated as heat in all components in the fast decay current path, dominated by the fast decay circuit 145, or more specifically by voltage drop of the TVS diode. This turn-off method can be considered to be very fast in comparison to recirculation in the slow decay current path 142.

The control circuitry 140 is configured to selectively connect the inductor 131 to a fast decay current path 141 or a slow decay current path 142. In particular it is herein proposed to control the high and low side switches 143, 144 stepwise during a discharge procedure in a manner that allows discharge current to flow through the inductor 131, while allowing for several different recirculation paths during one discharge procedure, whereby stepwise discharge of the inductor is enabled.

More specifically, to activate the fast decay current path 141, the high side switch is switched off, while the low side switch 144 is kept switched on. This discharge method can be considered slow. To activate the fast decay current path 142, both the high and low side switches 143, 144 are switched off. This discharge method can be considered to be very fast in comparison to recirculation in the slow decay current path 142. To charge the inductor 131 both the high and low side switches 143, 144 are switched on.

A third recirculation strategy also exists, which is inferior in this particular application, but which should be mentioned. This third recirculation strategy corresponds to "medium decay" and is done by keeping the low side switch 144 off and the high side switch on 143. The decay voltage will in this case be the voltage drop over the TVS diode minus the power source voltage.

Figure 4:
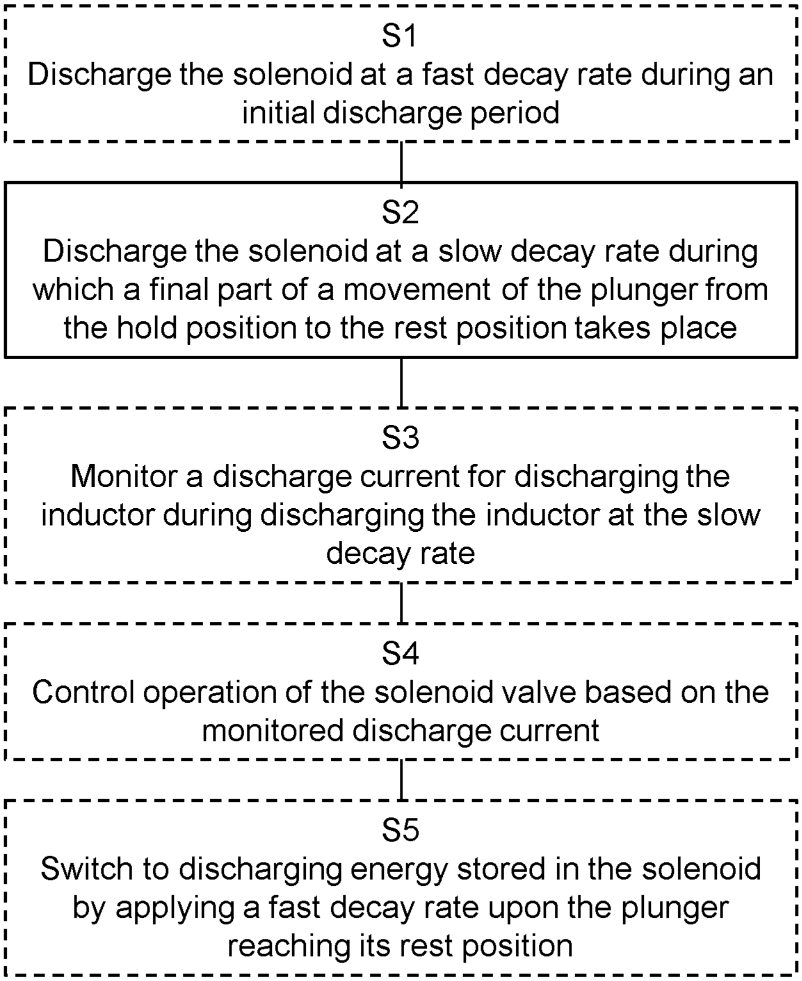
FIG. 4 is a flow chart of a method for controlling a solenoid valve according to the first aspect.

The proposed technique will now be described in further detail with reference to FIGS. 3 and 4. FIG. 4 is a flow chart of a method for controlling discharge of a solenoid valve 13 arranged in a vehicle 1. Some steps illustrated in the flow chart are optional and are therefore illustrated with dashed lines. The method is implemented using circuitry, such as the discharge circuit 14 of FIG. 3. The method is controlled by a control arrangement 10 (FIG. 5), such as an ECU, that causes the discharge circuit 14 to perform the method. The method is for example performed during normal operation of a vehicle 1 when the combustion engine 11 is running, to control injection of a fluid into the combustion engine 11.

The proposed method comprises stepwise discharge of the inductor 131. More specifically, the method comprises discharging the inductor 131 by applying different decay rates during different subsequent time periods (or intervals) of one single discharge cycle. One discharge cycle, or discharge procedure, herein refers to discharging the inductor once. One discharge cycle typically corresponds to one actuation (i.e. opening or closing) of the solenoid valve 13. These time periods are herein denoted an initial time period $t_1$, an operating time period $t_2$, and an end time period $t_3$. The operating time period $t_2$ refers to a time period when a final part of a movement of the plunger, i.e. a time period just before the plunger 132 reaches its rest position takes place. Hence, the movement of the plunger is typically detectable during the operating time period $t_2$. The rest position is a position where the plunger is prevented from further movement. In conclusion, the operating time period $t_2$ is a time interval where an operation such as closing or opening of the valve takes place, or is at least detectable. In some embodiments a major part of, or even the entire, movement of the plunger 132 takes place in the operating period $t_2$.

More specifically, the method comprises during one discharge cycle performing the step of discharging S2 the inductor 131 at a slow decay rate, during an operating time period $t_2$ during which a final part of a movement of the plunger 132 from the hold position to the rest position takes place. The method further comprises to during the same discharge cycle also performing a step of discharging S1, S5 the inductor 131 at a fast decay rate during at least one other time period, which takes place before or after the operating time period $t_2$. In other words, the other time period comprises the initial time period $t_1$ and/or the end time period $t_3$. The plunger 132 is stagnant during at least a part of this at least one other time period. Stated differently, the fast decay rate is mainly used when the plunger 132 is not moving, i.e. before or after the actual movement of the plunger 132 as described above. The plunger may be stagnant because it has not yet started to move, or because it has reached its rest position. In other words, in some embodiments, the plunger 132 is stagnant during a major part of the at least one other time period $t_1$, $t_3$.

The fast decay rate corresponds to fast energy dissipation and the slow decay rate corresponds to slow energy dissipation. The fast decay rate and the slow decay rates may be implemented in different ways as long as the fast decay rate is faster, i.e. a higher rate, than the slow decay rate. For example different recirculation paths are used as described in connection to FIG. 3. Typically, the fast decay rate is significantly faster than the slow decay rate, such that the difference in generated electromagnetic field (and consequently plunger movement speed) is significant i.e. detectable. In some embodiments, the inductor 131 is discharged using the fast decay current path 141 to obtain the fast decay rate. In other words, in some embodiments, the discharging is dominated by voltage drop caused by a fast decay circuit 145 when the fast decay rate is applied. Hence, the fast decay circuit 145 is the component that emits the most power of all the components in the fast decay current path 141. Typically, the majority (more than 50% of) of the power emission takes place in the fast decay circuit 145. In some embodiments, almost all (i.e. more than 90% of) the power emission occurs in the fast decay circuit 145. For example, the fast decay circuit 145 comprises a Zener diode, transient-voltage-suppression diode and/or one or more transistors to achieve high energy dissipation.

In some embodiments, the inductor 131 is discharged using, at least partly, the slow decay current path 142 to obtain the slow decay rate. In other words, in some embodiments, the discharging S2 the inductor at the slow decay rate comprises dissipating energy as heat by recirculating a discharge current in a plurality of components in a recirculation current path.

The decay rate does not necessarily need to be constant. It does also not require that one single recirculation path be used. For example, the slow decay rate may be implemented by toggling between using the fast decay current path 141 and the slow decay current path 142. Then the slow decay rate is defined as an average decay rate over the operating time period and the fast decay rate is an average decay rate over the at least one other time period.

The method will now be described step by step with reference to FIG. 4. As will be understood from the following, the lengths for the different steps of the discharge procedure (herein called time periods) can be either adjusted from one discharge cycle to the next using the previously measured values or adapted for long term use. In other words, in some embodiments, durations of the operating time period $t_2$ and/or the at least one other time period $t_1$, $t_3$ are either pre-defined or dynamically configurable. A combination thereof is also possible.

In one basic form, the proposed method comprises initiating the discharge process by discharging the inductor through the "fast decay rate" circuit for a fixed amount of time before switching to the "slow decay rate" circuit. In other words, in some embodiments, the discharging S1 the inductor 131 at the fast decay rate is performed prior to the discharging S2 the inductor 131 at the slow decay rate.

The time using the fast decay rate is in some example embodiments shorter than the time required to discharge the inductor 131 enough for any mechanical component controlled by the inductor 131 to start moving. In other words, in some embodiments switching from fast decay rate to slow decay rate takes place before the plunger 132 starts to move. This enables faster opening (or closing) of the solenoid valve 13 than allowed by the "recirculation" circuit alone whilst still allowing low performance (i.e. low sample rate) hardware to be used to sample the discharge current when the actual plunger movement takes place. In other words, in some embodiments, switching from discharging S1 the inductor 131 at the fast decay rate to the discharging S2 the inductor 131 at the slow decay rate is performed at the latest when the plunger 132 starts to move from the hold position. In this way detection of electric magnetic force caused by the entire movement of the plunger 132 is facilitated or even enabled.

In yet another application of the disclosure, the "fast decay" discharge is used until the inductor is sufficiently discharged and the plunger 132 has almost, or even completely, finished its movement. At that time, "recirculation" is applied in order to better be able to measure the remaining discharge current. By analyzing the current rate of change, the position of the plunger 132 can be determined (since the decay rate will vary with the inductance of the inductor and the inductance will vary depending on the position of the plunger 132. This information can be used in for example diagnostic tests to determine if the plunger 132 is stuck. Hence, in these embodiments only a portion of the plunger movement takes place in the operating time period. In other words, in some embodiments, the fast decay rate may be partly used also while the plunger 132 moves and switches to slow decay rate merely to enable measuring only the last discharge current for diagnosis. Hence, in some embodiments, switching from discharging S1 the inductor 131 at the fast decay rate to the discharging S2 the inductor 131 at the slow decay rate is performed at the latest a predefined time before the plunger reaches the rest position. The predefined time is just a short time period such as a few milliseconds to perform the measurements. In this way detection of electric magnetic force caused by the final part of a movement of the plunger 132 is facilitated. In this way it is possible to detect that the plunger 132 is not stuck.

The discharge S2 of the inductor 131 is then performed at a slow decay rate during the operating time period $t_2$. At least a final part of a movement of the plunger 132 from the hold position to the rest position takes place during the operating time period. When the plunger 132 of the solenoid valve 13 moves, the back-electromotive force caused by the movement of magnetic material in a coil manifests as a current that can be measured and used to calculate the position of the plunger 132 in the coil 131. This current is used to detect the full opening (or closing) of the solenoid valve 13. In some embodiments, the current caused by the movement of the plunger is measurable when using the slow decay rate, but not while using the fast decay rate. This is because the fast decay circuit 145 dissipates the energy much too fast. Hence, when discharging the inductor 131 at the slow rate the discharge current can be monitored with relaxed performance requirements. Hence, in some embodiments, the method comprises monitoring S3 a discharge current for discharging the inductor during discharging S2 the inductor at the slow decay rate. For example, a characteristic "bump" in the discharge current rate caused by a plunger movement causing solenoid valve opening (or closing) can be detected. In other words, the monitoring S3 comprises detecting a back-electromotive force caused by the movement of the plunger.

In some embodiments, the method comprises controlling S4 operation of the solenoid valve 13 based on the monitored discharge current. The measured discharge current measurement can be used to, for example, diagnose stuck mechanical hardware as no change (i.e. no characteristic "bump") in the current rate of change is detected when the plunger 132 of a solenoid valve fails to move. The monitored current can also be used for regulation. For example, a measured time from the start of the discharge until detection of an electromotive force (i.e. the "bump") caused by the movement of the plunger 132 can be used to adjust any one of the time periods $t_1$ $t_2$, $t_3$ for applying the fast and slow decay rates in order to achieve desired properties.

The proposed technique can in addition, or instead, be used in order to minimize the risk of having the plunger 132 bounce as it hits the stop at the end of its movement. This can be done by performing the actual movement (and possibly the preceding discharge) phase using the slow decay rate and at about the same time as the plunger movement is completed switch to fast decay rate. This will increase the decay rate to minimize the risk of the plunger bouncing causing the inductor valve 13 to open (or close) again. In other words, in some embodiments, the discharging S5 the inductor 131 at the fast decay rate is performed subsequent to the discharging S2 the inductor 131 at the slow decay rate.

In the same way as in the previous embodiments, the necessary times for the different periods of the discharge process can be either adjusted from one actuation to the next using the previously measured values or adapted for long term use. In some embodiments, switching from discharging S2 the inductor 131 at the slow decay rate to the discharging S1 the inductor 131 at the fast decay rate is performed upon the plunger 132 reaching the rest position such that rebounce of the plunger 132 from the rest position is prevented. Hence, in these embodiments durations of the time periods $t_1$ $t_3$ for applying the slow and fast decay rates are configured to ensure rapid discharge of the inductor once the plunger has reached its rest position in order to minimize the risk of the plunger bouncing as it reaches the rest position. The timing for the switching can be either fixed, dynamically adjusted or trigger based. The trigger may for example be detection of plunger movement based on monitoring S3 the discharge current.

In one application of the disclosure, the amount of time that "fast decay" is used during the discharge process can be controlled in order to minimize variations in discharge times between different hardware individuals, operating conditions (for example temperature) and aging phenomenon. This could be done by monitoring S3 the discharge current during the operating time period of the discharge process in order to determine the time needed for the discharge process (for example detecting the characteristic change in the discharge current rate indicating the mechanical movement of the plunger 132 in a solenoid valve 131). The fast decay time of a next actuation (i.e. discharge) can then be compensated for any deviation from the desired discharge time. This can also be performed in an adaptive manner where the control arrangement 10 can learn the required adjustment for different operating points and store that information for later use. In other words, in some embodiments, durations of the operating time period and the at least one other time period are configured to achieve a certain total discharge time. The total discharge time comprises a time from starting the discharging until the plunger has reached the rest position. The certain total discharge time may be a predefined calibration time. In this way it is possible to achieve similar opening or closing behavior among a plurality of vehicles independent on hardware, wear, temperature, age etc.

In yet another application of the disclosure, the initial phase of the discharge procedure is performed using "fast decay" in order to minimize the total discharge time. After a preconfigured amount of time, the system can start toggling a slower decay mode in order to slow the motion of any hardware controlled by the inductor to limit the acceleration (and thus minimize wear). This phase can be controlled through Pulse Width Modulation, PWM, of the high side OR low side driver where the PWM ratio will control the speed of the discharge and thus the motion of the plunger 132. In other words, in some embodiments, discharging S2 the inductor 131 at a slow decay rate during the operating time period is achieved by toggling between the fast decay rate and another decay rate lower than the fast decay rate. Whilst this will typically make current measurement very difficult (due to the PWM modulation), it will allow for faster motion of the connected hardware than would be the case with just slow decay rate whilst still being slower than "Fast Decay". As the decay rate can be controlled during the PWM phase, the rate can even be varied during the actual motion of the hardware in order to optimize the motion pattern if needed.

Figure 5:
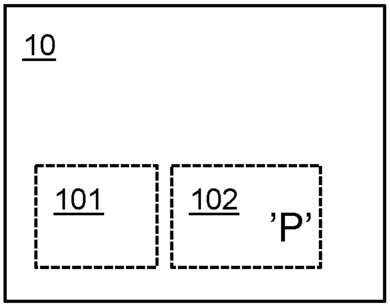
FIG. 5 illustrates a control arrangement configured to control the method according to the first aspect in more detail.

FIG. 5 illustrates a control arrangement 10 configured to by means of the fast and slow decay current paths 141, 142 and the control circuitry 140, perform any one of the embodiments of the method described in FIG. 4. More specifically, the control arrangement 10 is configured to control a switching arrangement, such high and low side switches 143, 144, to selectively connect the inductor 131 to the fast and slow decay current paths 141, 142. In some embodiments, the control arrangement 10 is also configured to measure and evaluate the current through the inductor in order to evaluate the closing or opening of the solenoid valve 13.

The control arrangement 10 may comprise one or more ECUs. An ECU is basically a digital computer that controls one or more electrical systems (or electrical sub systems) of the vehicle 1 based on e.g. information read from sensors and meters placed at various parts and in different components of the vehicle 1. ECU is a generic term that is used in automotive electronics for any embedded system that controls one or more functions of the electrical system or sub systems of a vehicle 1.

The control arrangement 10 comprises hardware and software. The hardware basically comprises various electronic components on Printed Circuit Board, PCB. The most important of those components is typically one or more processors 101 e.g. a microprocessor, along with memory 102 e.g. EPROM or a Flash memory chip. For simplicity only one processor 101 and memory 102 is illustrated in the control arrangement 10, but in a real implementation it could of course be more.

The control arrangement 10, or more specifically a processor 101 of the control arrangement 10, is configured to cause the control arrangement 10 to perform all aspects of the method described above and below. This is typically done by running computer program code 'P' stored in the memory 102 in the processor 101 of the control arrangement 10.

Figure 6A:
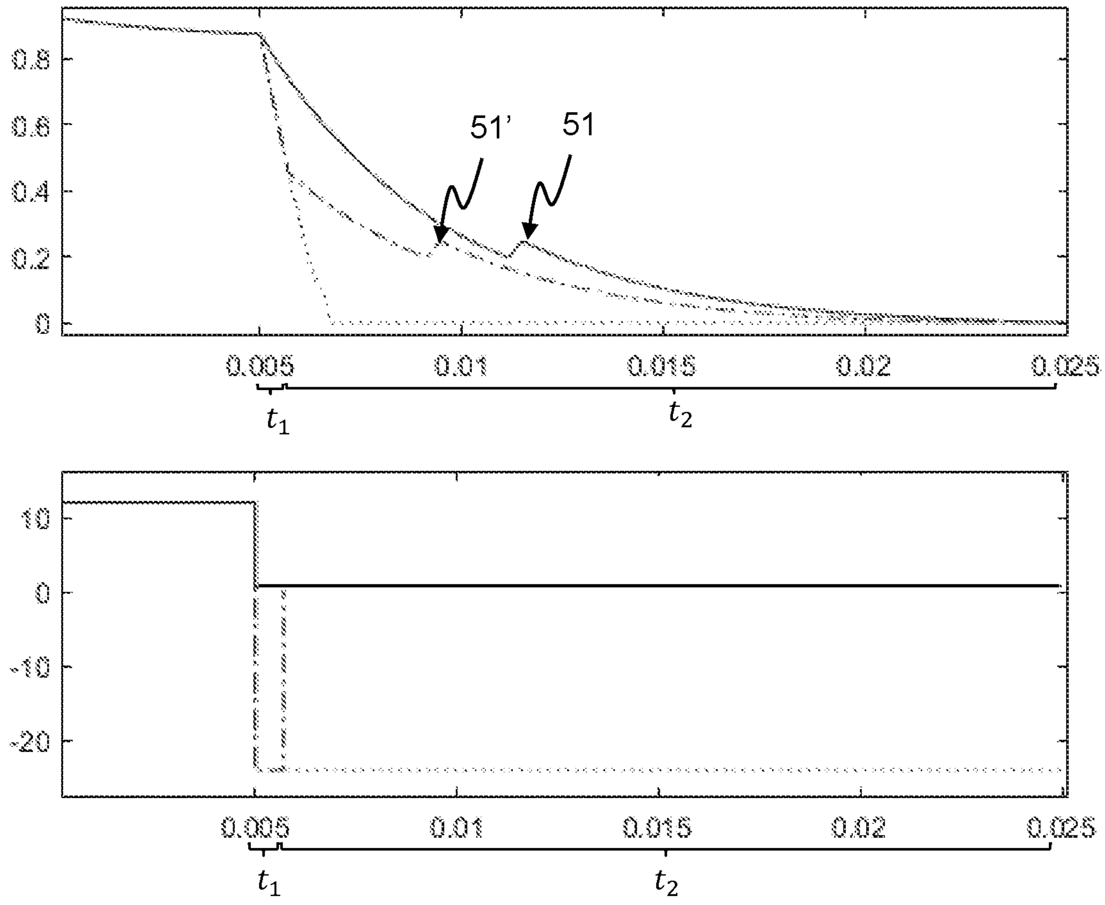
FIGS. 6A and 6B are graphs illustrating measured inductor current and voltage using the method proposed.

FIG. 6A shows the current (upper diagram) in an inductor while discharging the inductor 131 using the proposed method (dash dotted line) using the fast decay rate during an initial time period. The lower diagram illustrates voltage across a TVS diode (FIG. 3) used to achieve the fast decay rate. For comparison current and voltage when using the slow decay rate only (solid line) or fast decay rate only (dotted line) is also illustrated.

When using only the slow decay rate (solid line) the characteristic bump 51 in the current rate caused by the solenoid valve opening (or closing) is clearly visible. When using the slow rate, the voltage over the TVS diode decreases to zero when low side switch is closed.

However using only the fast decay rate (dotted line), the current almost immediately decreases to zero at a fast rate. However, with this method the characteristic "bump" in the current rate caused by the solenoid valve opening (or closing) is not visible at all. With this method the voltage over the TVS diode corresponds to the break sown voltage during the entire discharge procedure.

In this example embodiment of the proposed method a fast decay rate is used during an initial time period $t_1$ microseconds. During the initial time period $t_1$ the current in the inductor decreases to zero at a fast rate. Upon expiry of the initial time period discharging is switched to use the slow decay rate during the operating time period $t_2$, where the characteristic "bump" 51' in the current rate caused by the solenoid valve closing (or opening) is clearly visible. It is also visible that the time it takes before the solenoid valve is closed (or opened), is shorter than when using only the slow decay rate. Hence, much faster turn-off time is achieved. With this method the voltage over the TVS diode corresponds to the break down voltage only during the initial time period.

Figure 6B:
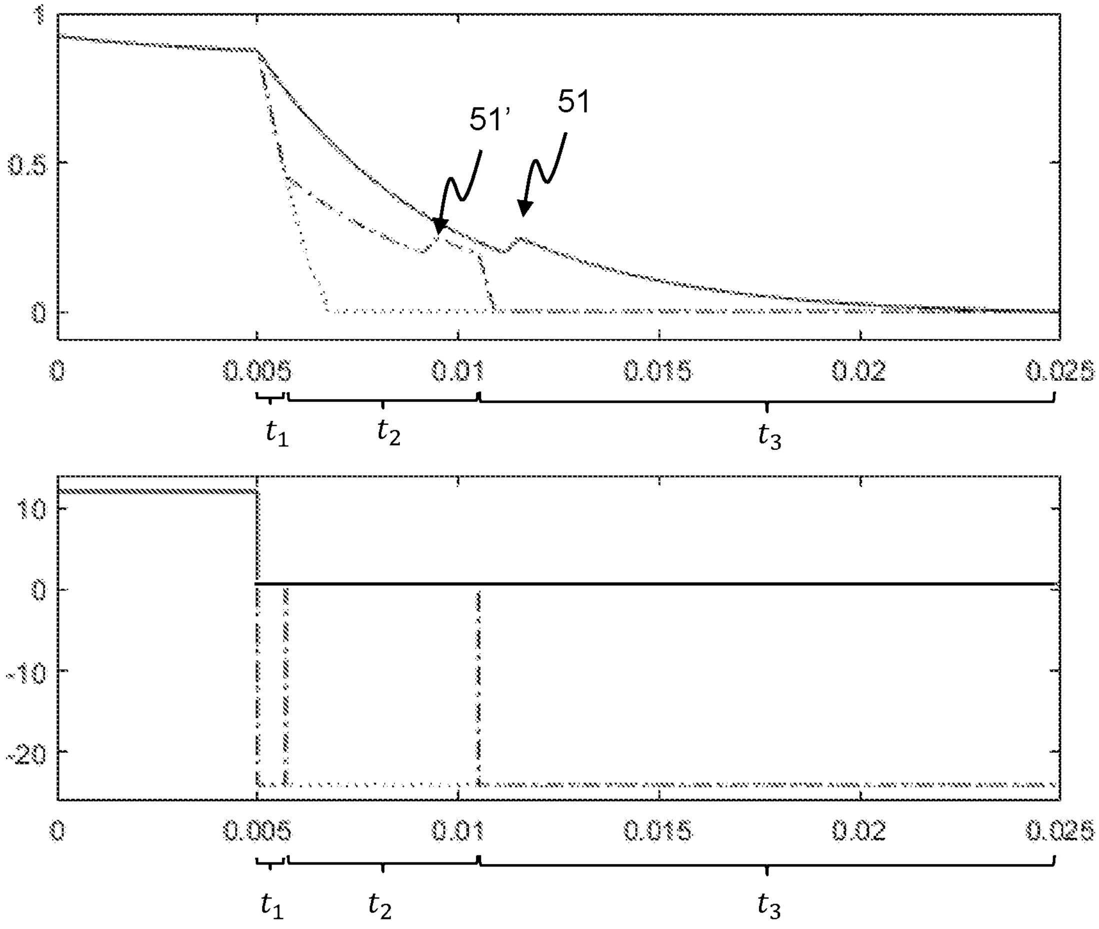

FIG. 6B shows the current (upper diagram) in an inductor and voltage over the TVS diode while discharging the inductor 131 using the proposed method (dash dotted line) using the fast decay rate during an initial time period $t_1$ as well as during an end time period $t_3$. For comparison current and voltage when using the slow decay rate only (solid line) or fast decay rate only (dotted line) explained in connection to FIG. 6A are also illustrated.

In this example embodiment of the proposed method a fast decay rate is used during an initial time period $t_1$ microseconds. During the initial time period $t_1$ the current in the inductor decreases at a fast rate. Upon expiry of the initial time period discharging is switched to use the slow decay rate during the operating time period $t_2$, where the characteristic "bump" 51' in the current rate caused by the solenoid valve opening (or closing) is clearly visible. The fast decay rate is then applied again during an end time period, whereby bouncing of the plunger 132 is prevented as explained above. With this embodiment the voltage over the TVS diode corresponds to the break down voltage during both during the initial time period $t_1$ and during the end time period $t_3$.

The terminology used in the description of the embodiments as illustrated in the accompanying drawings is not intended to be limiting of the described method; control arrangement or computer program. Various changes, substitutions and/or alterations may be made, without departing from disclosure embodiments as defined by the appended claims.

The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims.

The invention claimed is:

1. A method for controlling discharge of a solenoid valve arranged in a vehicle, wherein the solenoid valve comprises an inductor and a plunger arranged to be moved by the inductor from a hold position to a rest position, whereby the solenoid valve is opened or closed, the method comprising:

discharging the inductor at a fast decay rate during a first time period during a first part of movement of the plunger from the hold position to the rest position, wherein the plunger is stagnant during at least a part of said first time period;

discharging the inductor at a slow decay rate during a second time period following the first time period during a second part of movement of the plunger from the hold position to the rest position, wherein the fast decay rate is faster than the slow decay rate;

monitoring a discharge current for discharging the inductor during discharging the inductor at least during discharging the inductor at the slow decay rate during the second time period; and further controlling discharging of the inductor at either the fast decay rate or the slow decay rate in a third time period based on the monitored discharge current until the plunger reaches the rest position.

2. The method according to claim 1, wherein the plunger is stagnant during a major part of the at least one other time period.

3. The method according to claim 1, wherein switching from discharging the inductor at the fast decay rate to the discharging the inductor at the slow decay rate is performed at the latest a predefined time before the plunger reaches the rest position.

4. The method according to claim 3, wherein switching from discharging the inductor at the fast decay rate to the discharging the inductor at the slow decay rate is performed at the latest when the plunger starts to move from the hold position.

5. The method according to claim 1, wherein controlling discharging of the inductor at either the fast decay rate or the slow decay rate in a third time period comprises discharging the inductor at the fast decay rate after discharging the inductor at the slow decay rate in the second time period.

6. The method according to claim 5, wherein switching from discharging the inductor at the slow decay rate to discharging the inductor at the fast decay rate is performed upon the plunger reaching the rest position such that rebounce of the plunger from the rest position is prevented.

7. The method according to claim 1, wherein monitoring a discharge current for discharging the inductor comprises detecting from the discharge current an indication of a back-electromotive force caused by the movement of the plunger.

8. The method according to claim 1, wherein durations of the first and second time periods are either pre-defined or dynamically configurable.

9. The method according to claim 1, wherein durations of the first, second, and third time periods are configured to achieve a certain total discharge time, and wherein the total discharge time comprises a time from starting the discharging until the plunger has reached the rest position.

10. The method according to claim 1, wherein discharging the inductor at the fast decay rate comprises connecting the inductor to a fast decay circuit.

11. The method according to claim 10, wherein the fast decay circuit comprises a Zener diode, transient-voltage-suppression diode and/or one or more transistors.

12. The method according to claim 1, wherein discharging the inductor at the slow decay rate comprises dissipating energy as heat by recirculating a discharge current in a plurality of components in a recirculation current path.

13. The method according to claim 1, wherein the slow decay rate is an average decay rate over the second time period and the fast decay rate is an average decay rate over the first time period.

14. The method according to claim 1, wherein discharging the inductor at a slow decay rate is achieved by toggling between the fast decay rate and another decay rate lower than the fast decay rate.

15. The method according to claim 1, wherein the solenoid valve is arranged to open or close a nozzle of an injector.

16. A discharge circuit configured to control a solenoid valve comprising an inductor and a plunger arranged to be moved by the inductor from a hold position to a rest position, whereby a nozzle of the solenoid valve is opened or closed, wherein the discharge circuit comprises:

fast decay current path configured to discharge the inductor at a fast decay rate;

a slow decay current path configured to discharge the inductor at a slow decay rate, wherein fast decay rate is faster than the slow decay rate; and control circuitry configured to selectively connect the inductor to the fast and slow decay current paths, wherein the discharge circuit is configured to, by means of the fast and slow decay current paths and the control circuitry, perform a method of:

discharging the inductor at a fast decay rate during a first at least one other-time period during a first part of movement of the plunger from the hold position to the rest position, wherein the plunger is stagnant during at least a part of said first other-time period;

discharging the inductor at a slow decay rate during a second time period following the first time period during a second part of movement of the plunger from the hold position to the rest position, wherein the fast decay rate is faster than the slow decay rate;

monitoring a discharge current for discharging the inductor during discharging the inductor at least during discharging the inductor at the slow decay rate during the second time period; and further controlling discharging of the inductor at either the fast decay rate or the slow decay rate in a third time period based on the monitored discharge current until the plunger reaches the rest position.

17. A vehicle comprising a discharge circuit configured to control a solenoid valve, said solenoid valve comprising an inductor, a plunger arranged to be moved by the inductor from a hold position to a rest position, whereby a nozzle of the solenoid valve is opened or closed, wherein the discharge circuit comprises:

fast decay current path configured to discharge the inductor at a fast decay rate;

a slow decay current path configured to discharge the inductor at a slow decay rate, wherein fast decay rate is faster than the slow decay rate; and control circuitry configured to selectively connect the inductor to the fast and slow decay current paths, wherein the discharge circuit is configured to, by means of the fast and slow decay current paths and the control circuitry, perform a method of:

discharging the inductor at a fast decay rate during a first at least one other time period during a first part of movement of the plunger from the hold position to the rest position, wherein the plunger is stagnant during at least a part of said first other time period;

discharging the inductor at a slow decay rate during a second time period following the first time period during a second part of movement of the plunger from the hold position to the rest position, wherein the fast decay rate is faster than the slow decay rate;

monitoring a discharge current for discharging the inductor during discharging the inductor at least during discharging the inductor at the slow decay rate during the second time period; and further controlling discharging of the inductor at either the fast decay rate or the slow decay rate in a third time period based on the monitored discharge current until the plunger reaches the rest position.

* * * * *